Figure 1:
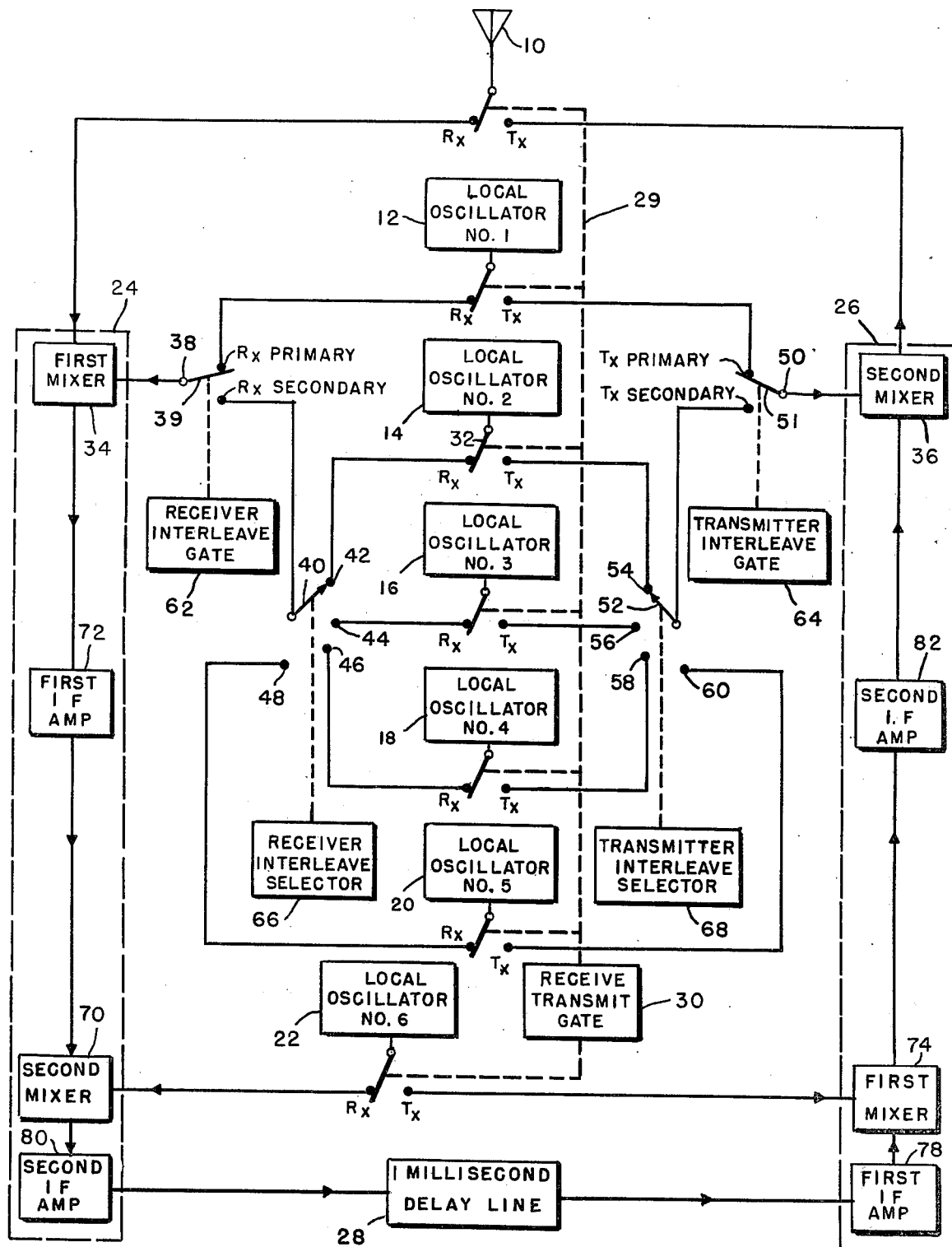

United States Patent [19]
Miller

[11] 3,955,200
[45] May 4, 1976

[54] INTERLEAVING JAMMING TECHNIQUE
[75] Inventor: Leon Miller, Little Silver, N.J.
[73] Assignee: The United States of America as represented by the Secretary of the Army, Washington, D.C.
[22] Filed: Apr. 6, 1961
[21] Appl. No.: 101,308

[52] U.S. Cl. ............................. 343/18 R; 325/132; 343/18.0; 102/70.2 R; 102/70.2 P
[51] Int. Cl.² ........................................... G01S 7/36
[58] Field of Search .................. 102/70.2 P, 70.2 R; 343/18 R, 18 D; 325/132

[56] References Cited
UNITED STATES PATENTS
2,910,691   10/1959   Rhyins ................................. 343/18
2,943,318   6/1960   Deloraine et al. ..................... 348/18

*Primary Examiner*—Maynard R. Wilbur
*Assistant Examiner*—S. C. Buczinski
*Attorney, Agent, or Firm*—Nathan Edelberg; Robert P. Gibson; Jeremiah G. Murray

EXEMPLARY CLAIM

1. The method for producing radio-frequency signals for jamming the detectors in twin channel type variable-time proximity fuzes comprising the steps of detecting a first radio-frequency signal radiated from said variable-time proximity type fuze within a first prescribed range of frequencies, alternately detecting said first signal and a second radio-frequency signal radiated from said fuze within a second prescribed frequency range, the alternating rate being at a frequency much higher than the band-pass of the said variable-time fuze detectors, delaying each of said detected signals a prescribed time in the order that they are detected, sequentially deriving from said delayed detected signals respective radio-frequency signals having frequencies equal to said first and second fuze radiated signals respectively, and alternately transmitting said derived radio frequencies at said alternating rate for a time equal to said delay time to provide interleaved transmitted signals.

7 Claims, 2 Drawing Figures

INVENTOR,
LEON MILLER

INTERLEAVING JAMMING TECHNIQUE

The invention described herein may be manufactured and used by or for the Government for governmental purposes without the payment of any royalty thereon.

This invention relates to radio-frequency jammer systems and more particularly to a method for effectively jamming twin channel variable-time proximity type fuzes hereinafter referred to as VT fuzes.

The conventional single oscillator VT fuze is ordinarily detonated by a doppler frequency signal which is equal to $2V/\lambda$ where $V$ is the velocity of the fuze toward the ground and $\lambda$ is the wavelength of the oscillator frequency. Such doppler frequencies are usually in the audio range so that the pulse bandwidth of the fuze detector may be designed to pass only the audio frequency. As a practical matter, the bandwidth of the detectors in such fuzes are designed to pass anywhere from 250 cycles to 2 kc. and the detonating signal must be present for a duration ranging between 20 and 40 milliseconds.

The twin channel type VT fuzes utilizes two oscillators operating at discrete frequencies. In general, they are designed so that they can only be detonated by a returned doppler frequency signal which produces both frequencies simultaneously and which must be present for 1 millisecond. In view of these conditions, no countermeasure system has heretofore been developed which is capable of detonating both the single oscillator type and twin channel oscillator type of VT fuze. If a conventional repeater is used, that is, one of finite bandwidth which either sweeps across or steps across the total required frequency range to be protected and, which to satisfactorily provide protection, must do this not less often than about twice per second, then with normally maximum bandwidth of 10 to 15 mcs., again limited by many factors such as signal-to-noise ratio, etc., twin fuzes could not be jammed. It is known also that for practical reasons the difference between the frequencies of the two oscillators in a twin fuze type can not be more than 60 mc. apart and that, for the present at least, the frequency for fuze operation covers a range from 60 mc. to 300 mc.

It is an object of the present invention to provide an improved method for detonating double oscillator VT fuzes and yet be capable of detonating more orthodox type VT fuzes employing a single oscillator.

Briefly, the present invention provides a method for producing radio-frequency signals adapted to jam the detectors in twin channel type VT fuzes. It comprises the steps of detecting, within a prescribed range of frequencies, a first radio-frequency signal radiated from one channel of the VT type fuze; sequentially stepping through successive ranges of the same scope of frequency as the prescribed range for detecting a second radio-frequency signal from the other VT fuze channel after the detection of the first radio-frequency signal; alternately detecting the first and second radio-frequency signals radiated from the VT fuze at a rate higher than the band-pass of the fuze detectors; delaying the first and second alternately detected signals a prescribed time in the order they are detected; sequentially deriving from the delayed detected signals respective radio-frequency signals at frequencies equal to the first and second radiated fuze signals; and interleaving the transmission of the derived radio frequencies at the same rate the fuze radiated signals were alternately detected, and simultaneously precluding the detection of further fuze radiated signals, the duration of interleaved transmission being equal to the prescribed delay time.

Figure 2:
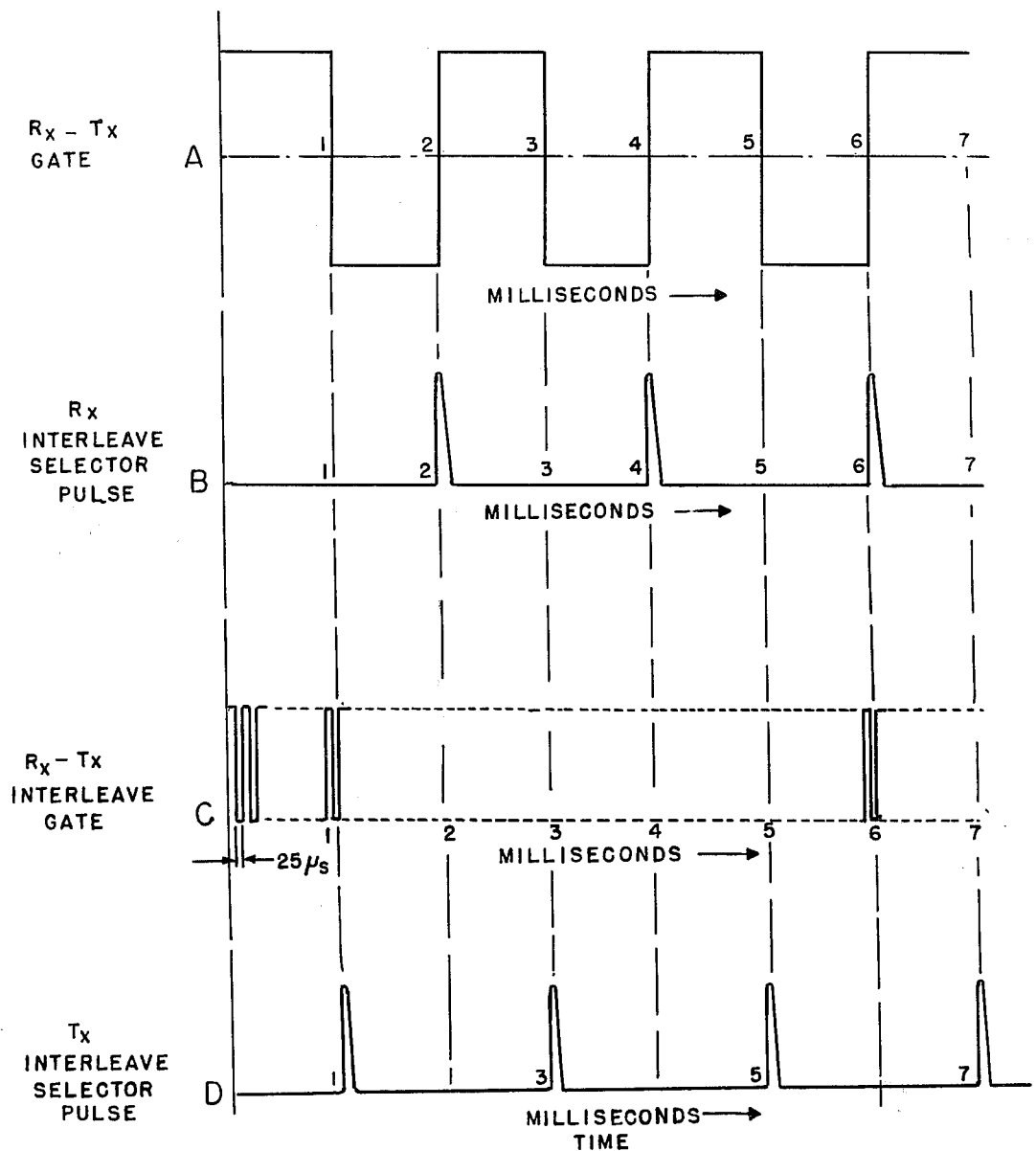

For a better understanding of the invention, together with other and further objects thereof, reference is had to the following description taken in connection with the accompanying drawing in which:

FIG. 1 is a schematic block diagram illustrating an embodiment for carrying out the present invention; and FIG. 2 illustrates a group of curves helpful in explaining the operation of the schematic arrangement shown in FIG. 1.

FIG. 1 illustrates an embodiment of a two-way repeater which incorporates elements making it possible to detonate both the conventional single oscillator VT fuzes and double oscillator VT fuzes in accordance with the present invention. As shown, it includes an antenna 10, six local oscillators 12–22, a receiver channel 24, a transmitter channel 26, and a one millisecond delay line 28 interconnecting the receiver channel 24 and the transmitter channel 26. Each channel includes two mixer circuits and two IF amplifier stages hereinbelow described. Since antenna 10 and the outputs of oscillators 12–22 are to be utilized both for reception and transmission, the outputs of the oscillators and antenna 10 are adapted to be switched in unison to connect with either the receiver or transmitter channel by means of ganged switch 29 which is actuated, as hereinafter explained, by the output of a receive-transmit gate 30. As shown, the input to and the output of antenna 10 and the respective outputs of each oscillator is represented by a switch as at 32 adapted to contact to either one of two respective terminals hereinafter designated as the receiver terminal and the transmitter terminal. The antenna receiver terminal is connected to the input of first receiver channel mixer 34 to provide one signal input thereto, while the antenna transmitter terminal is connected to the output of second transmitter mixer 36. The output of receive-transmit gate 30 comprises a rectangular AC wave whose amplitude polarity is reversed every millisecond. For one amplitude polarity, the outputs of oscillators 12–22 and antenna 10 are connected to their respective associated receiver terminals and for the other amplitude polarity the outputs of oscillators 12–22 and antenna 10 are connected to their respective transmitter terminals.

The second input to first receiver channel mixer 34 is supplied from local oscillators 12–20 in the following manner. The associated receiver terminal of local oscillator 12 is connected to one terminal, labeled receiver primary, of a double-pole single-throw switch 38, the switch arm 39 thereof being connected to the second input of first receiver channel mixer 34. The other terminal of switch 38, labeled receiver secondary, is connected to a rotary switch arm 40 which is adapted to sequentially contact terminals 42, 44, 46, and 48, which are, in turn, connected to the respective receiver output terminals of oscillators 14, 16, 18, and 20. In a similar manner, the transmitter terminal associated with the output of oscillator 12 is connected to one terminal, labeled transmitter primary, of a double-pole single-throw switch 50, the switch arm 51 thereof being connected to one input of second transmitter channel mixer 36. The other terminal of switch 50, labeled transmitter secondary, is connected to a rotary switch arm 52 which is adapted to contact terminals 54, 56, 58 and 60 which, in turn, are connected to the respective transmitter output terminals associated with the outputs of oscillators 14, 16, 18 and 20. Switch arm 39 of switch 38 is actuated by the output of a receiver interleave gate 62 adapted to produce a rectangular a-c wave at a frequency of 20 kc. Switch arm 51 of switch 50 is actuated by the output of transmitter interleave gate 64 adapted to produce a rectangular a-c 20 kc. wave identical to that of the output of receiver interleave gate 62. Thus the 20 kc. rectangular wave output from receiver interleave gate 62 and transmitter interleave gate 64 each comprise an a-c signal whose amplitude polarity is switched every 25 microseconds. For one amplitude polarity of the output of receiver interleave gate 62, switch arm 39 connects to the receiver primary terminal of switch 38, and for the other amplitude polarity thereof, switch arm 39 connects to the receiver secondary terminal of switch 38. Similarly, for one polarity of the output of transmitter interleave gate 64, switch arm 51 of switch 50 connects to the transmitter primary terminal of switch 50 and for the other amplitude polarity thereof, switch arm 51 connects to the transmitter secondary terminal of switch 50. Hence, switches 38 and 50 are switched back and forth between their respective primary and secondary terminals 40 times each millisecond. Rotary switch arm 40 is actuated by means of a receiver interleave selector 66 adapted to produce actuating pulses spaced 2 milliseconds apart, the first of these pulses being applied after an interval of 2 milliseconds from a starting time $T_o = 0$ as hereinafter explained. Similarly, rotary switch arm 52 is actuated by means of a transmitter interleave selector 68 adapted to produce actuating pulses spaced 2 milliseconds apart, the first of these pulses being applied after an interval of 1 millisecond from $T_o = 0$. In other words, receiver interleave selector 66 will sequentially actuate rotor switch arm 40 at 2, 4, 6, 8, 10, etc. millisecond intervals and transmitter interleave selector 68 will sequentially actuate rotor switch arm 52 at 1, 3, 5, 7, 9, etc. millisecond intervals.

The associated receiver output terminal of local oscillator 22 is connected as one input to second receiver channel mixer 70, the other input to mixer 70 being supplied through first receiver IF amplifier 72 which in turn is responsive to the output of first receiver channel mixer 34. Similarly, the associated transmitter output terminal associated with local oscillator 22 is connected as one input to first transmitter channel mixer 74, the other input to first transmitter channel mixer 74 being supplied through the one millisecond delay line 28 and first transmitter IF amplifier 78. As shown, the input to delay line 28 is connected to the output of second receiver channel IF amplifier 80 which is responsive to the output of second receiver channel mixer 70. A second input to transmitter second mixer 36 is derived from first transmitter mixer 74 through second transmitter IF amplifier 82, and the output of second transmitter 36 is connected to the transmitter terminal associated with antenna 10 as hereinabove explained.

It is to be understood that the schematic block diagram shown in FIG. 1 is merely illustrative to show the method of operation in which the invention resides. It is also to be assumed that the twin fuze VT oscillators operate anywhere in the range of 55 mc. to 105 mc. With these frequencies known, then the operational frequencies of the local oscillators 12–22 and the mixers of the receiver and transmitter channel will be as follows: Local oscillator 12 is tuned to provide a frequency of 600 mc. and local oscillators 14–20 are tuned in that order to frequencies successively 10 mc. higher so that the local oscillators 12–20 are tuned to produce 600, 610, 620, 630, and 640 megacycles, respectively. Local oscillator 22 is tuned to provide a frequency of 580 megacycles. Receiver channel mixers 34 and 70 and transmitter channel mixers 36 and 74, are tuned to pass a 10 megacycle band-pass. Receiver channel mixers 34 and 70 are adapted to pass 535–545 mc. and 35–45 megacycles, respectively. Transmitter channel mixers 36 and 74 are adapted to pass 535–545 mc. and 35–45 mc., respectively.

Now, referring to the wave shapes of FIG. 2, let it be assumed that at time T= 0, switches are in the position as shown in FIG. 1 and the outputs of receive-transmit gate 30, receiver interleave gate 62, receiver interleave selector 66, transmitter interleave gate 64 and transmitter interleave selector 68 are as shown. Thus, for the duration of the first millisecond, the output of receive-transmit gate 30 is such that the outputs of antenna 10 and local oscillators 12–22 are switched to their associated respective receiver terminals. Hence, during the first millisecond the output of antenna 10 and local oscillator 12 are applied as inputs to first receiver channel mixer 34. With local oscillator 12 tuned to 600 megacycles, an output will be derived from first receiver channel mixer 34 only if the 55–65 megacycle signal is available from the VT fuze. Assuming now that such a signal is available, an output will be derived from first receiver channel mixer 34 and applied to second receiver channel mixer 70 where it is heterodyned with the 580 megacycle output from local oscillator 22 to produce an output signal in the 35–45 megacycle range. The signal output from second receiver channel mixer 70 is applied to the 1 microsecond delay line 28 which delays the application of the received and translated 55–65 mc. signal for one millisecond before it is applied to transmitter channel 26. It is during this millisecond delay that the interleaving action takes place. During the first millisecond receiver interleave gate 62 produces rectangular pulses at a rate of 20 kc. For half of each cycle, i.e. 25 microseconds (FIG. 2C), switch arm 39 is connected to the receiver primary terminal of switch 38, and for the other half of each cycle, switch arm 39 connects to the receiver secondary terminal of switch 38. Thus, switch arm 39 is moved between the receiver primary and receiver secondary terminal of switch 38 40 times each millisecond. Since local oscillator 14 is tuned to 610 mc., any VT fuze signal between 65 and 75 megacycles will produce an output from receiver channel 24 as hereinabove described. This signal, of course, will be interleaved with the 55–65 mc. VT fuze signal for a duration of one millisecond. After one millisecond, the output of receive-transmit gate 30 will switch the antenna 10 and the outputs of local oscillators 12–22 to their associated respective transmitter terminals so that any signals passing through delay line 28 will be heterodyned in first transmitter channel mixer 74 with the output from local oscillator 22. While transmitter interleave gate 64 has been actuating switch arm 51 of switch 50 forty times between the $T_x$ primary and $T_x$ secondary terminal of switch 50, no signals could be transmitted, for the duration of the first millisecond, because the outputs of antenna 10 and the oscillators 12–22 are not connected in the transmitter channel circuit 26. For the duration of the second millisecond, however, the antenna 10 and the local oscillators 12–22 are connected to the transmitter channel circuit 26. Thus, as the 55–65 mc. signals and 65–75 mc. signals were applied to the one millisecond delay line 28, they would appear as one input at the first transmitter mixer 74 in the order they were placed into the delay line. In other words, the transmitted signals would be interleaved. The remaining VT fuze range signals are interleaved in the following manner. After the first millisecond, rotary switch arm 52 connects with contact 54 which in turn is connected to the transmitter terminal associated with the output of local oscillator 14. Thus, after the first millisecond, the outputs of local oscillators 12 and 14 will be applied alternately as inputs to second transmitter channel mixer 36 every 25 microseconds. After the second millisecond, antenna 10 and the outputs of local oscillators 12–22 are again switched to their associated receiver terminals. Also, after the second millisecond, switch arm 40 is actuated by the pulse output from receiver interleave selector 66 so that it now connects to contact 44. If any VT signals in both the 55–65 and 75–85 mc. ranges are now present, they will be interleaved and applied as hereinabove explained to delay line 28. At the beginning of the third millisecond, rotor switch arm 52 connects to terminal 56 so that the output of local oscillator 16 is utilized in the transmitter channel circuit so that interleave transmission occurs for the 55–65 and 75–85 megacycle signals to jam the VT fuze. The same process is repeated until all local oscillators are utilized to cover the entire range from 55–105 megacycles in 10 megacycle steps. It is to be understood, of course, that if 24 such steps were desired to be covered, that is 60 mc. to 300 mc., then 24 local oscillators would be utilized in addition to the final local oscillator 22. Also, it is to be noted that the one millisecond delay line and the 20 kc. receiver interleave gate frequency are merely specific examples and is not to be limited thereto. Also, the called for frequencies of the local oscillators 12–22 are merely illustrative and are not to be limited thereto and, furthermore, it is to be understood that six channel coverage is selected only on the basis of the bandwidth per channel and total expected separation of twin channel frequencies, and could differ materially with different fuze frequencies and narrower fuze channel bandwidths. Also, the first signal may be detected within any one of the 10 megacycle channels and the second detected signal will sequentially follow the first detected signal. In other words, the first signal may be detected by means of local oscillator No. 3 and the second signal may subsequently be detected by a local oscillator following local oscillator No. 3.

The theory behind the present invention is based on the well known fact that the band-pass of a VT fuze detector is at most, 2 kc., i.e. 1 kc. on either side of the center of the band-pass, and that square wave pulse modulated RF signals can be represented as an RF frequency surrounded by side-bands spaced from the carrier by an interval equal to the frequency of the modulating signal. Since the bandwidth of the fuze detector is smaller than the interval between repeater transmitted side-bands, each side-band will appear to the fuze detector as a CW signal even though the repeater is tuned on and off at the 20 kc. modulating rate. This, in turn, provides the necessary simulated "simultaneous" jamming required.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method for producing radio-frequency signals for jamming the detectors in twin channel type variable-time proximity fuzes comprising the steps of detecting a first radio-frequency signal radiated from said variable-time proximity type fuze within a first prescribed range of frequencies, alternately detecting said first signal and a second radio-frequency signal radiated from said fuze within a second prescribed frequency range, the alternating rate being at a frequency much higher than the band-pass of the said variable-time fuze detectors, delaying each of said detected signals a prescribed time in the order that they are detected, sequentially deriving from said delayed detected signals respective radio-frequency signals have frequencies equal to said first and second fuze radiated signals respectively, and alternately transmitting said derived radio frequencies at said alternating rate for a time equal to said delay time to provide interleaved transmitted signals.

2. The method in accordance with claim 1 wherein said prescribed delay time is 1 millisecond and wherein 40 of said interleaved transmitted signals occur during one millisecond.

3. The method in accordance with claim 1 wherein the rate of detection is at a frequency of 20 kc. and said delay time is one millisecond.

4. The method for producing radio-frequency signals for jamming detectors in channel type variable-time proximity fuze comprising the steps of detecting a first radio-frequency signal radiated from said fuze within a prescribed range of frequencies, sequentially stepping through successive ranges of frequency of the same scope as said prescribed range for detecting a second radio-frequency signal radiated from said fuze within one of the successive frequency ranges after the detection of said first radio-frequency fuze signal, alternately detecting said first and second radio-frequency signal radiated from said variable-time fuzes at a rate much higher than the band-pass of said fuze detectors, delaying said first and second alternately detected signals a prescribed time in the order that they are detected, deriving from said delayed detected signals respective radio-frequency signals at frequencies equal to said first and second fuze radiated signals, and alternately transmitting said derived radio frequencies at the same rate the fuze radiated signals were alternately detected and for a time equal to said delay time to provide interleaved transmitted signals.

5. The method for producing radio-frequency signals for jamming detectors in twin channel type variable-time proximity fuze comprising the steps of detecting a first radio-frequency signal radiated from said fuze within a prescribed range of frequencies, sequentially stepping through successive ranges of the same scope of frequency as said prescribed range for detecting a second radio-frequency signal radiated from said fuze within one of the successive frequency ranges after the detection of said first radio-frequency signal, alternately detecting said first and second radio-frequency signal radiated from said variable-time fuzes at a rate higher than the band-pass of the fuze detectors, delaying said first and second alternately detected signals a prescribed time in the order they are detected, sequentially deriving from said delayed detected signals respective radio-frequency signals at frequencies equal to said first and second fuze radiated signals, interleaving the transmission of said derived radio frequencies at the same rate the fuze radiated signals were alternately detected and simultaneously precluding the reception of further fuze signals, the duration of interleaved transmission being equal to said prescribed delay time.

6. The method in accordance with claim 5 wherein the alternate detecting rate is at 20 kc. and said prescribed delay time is one millisecond.

7. The method in accordance with claim 1 wherein the duration of signal detection is equal to said delay time.

* * * * *